July 21, 1925.
H. C. McCLEARY
1,546,985
HYDRAULIC BRAKE SYSTEM
Filed March 11, 1924
3 Sheets-Sheet 2
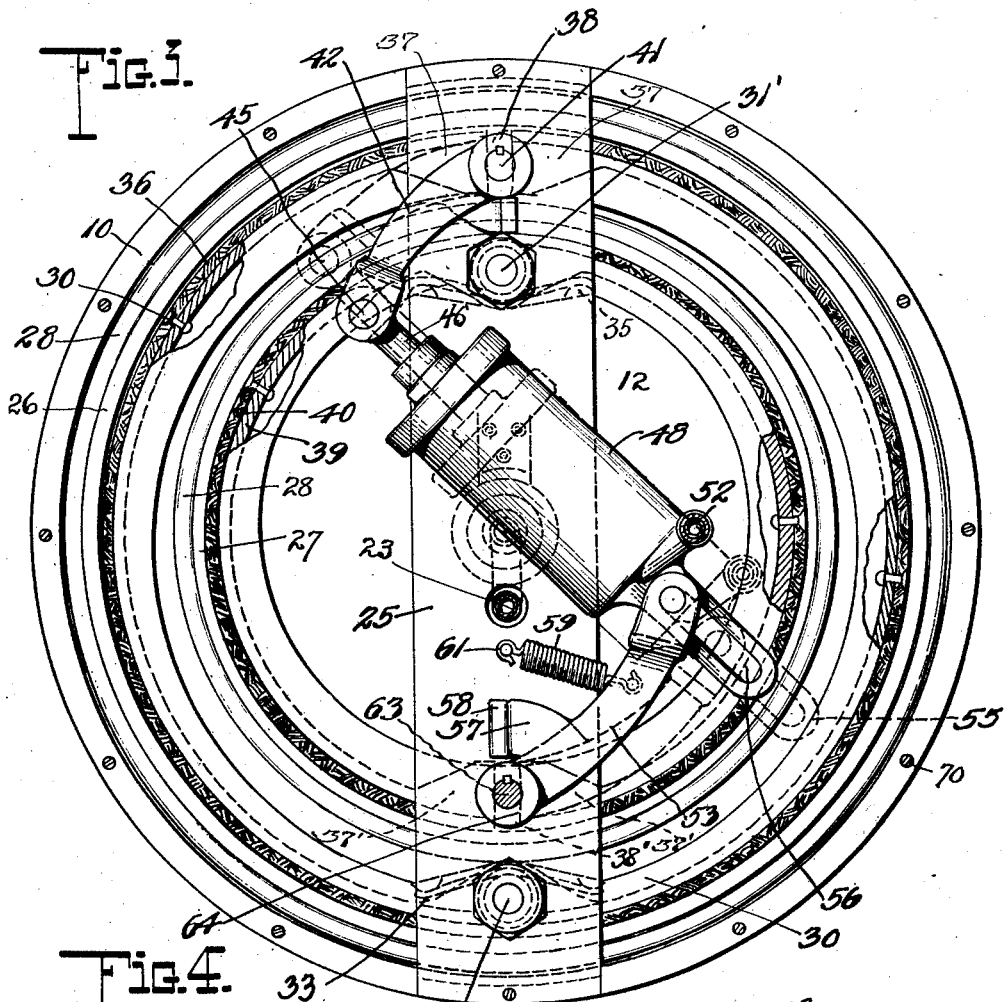
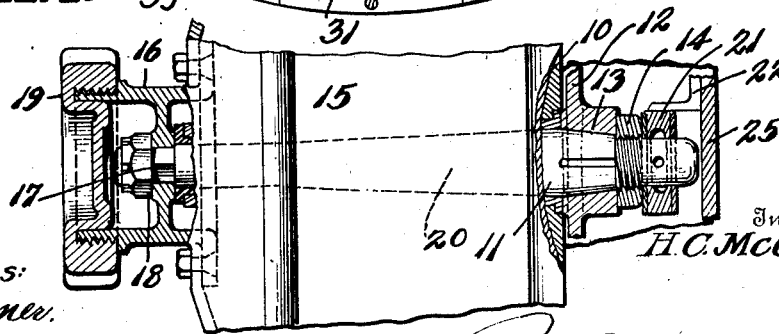

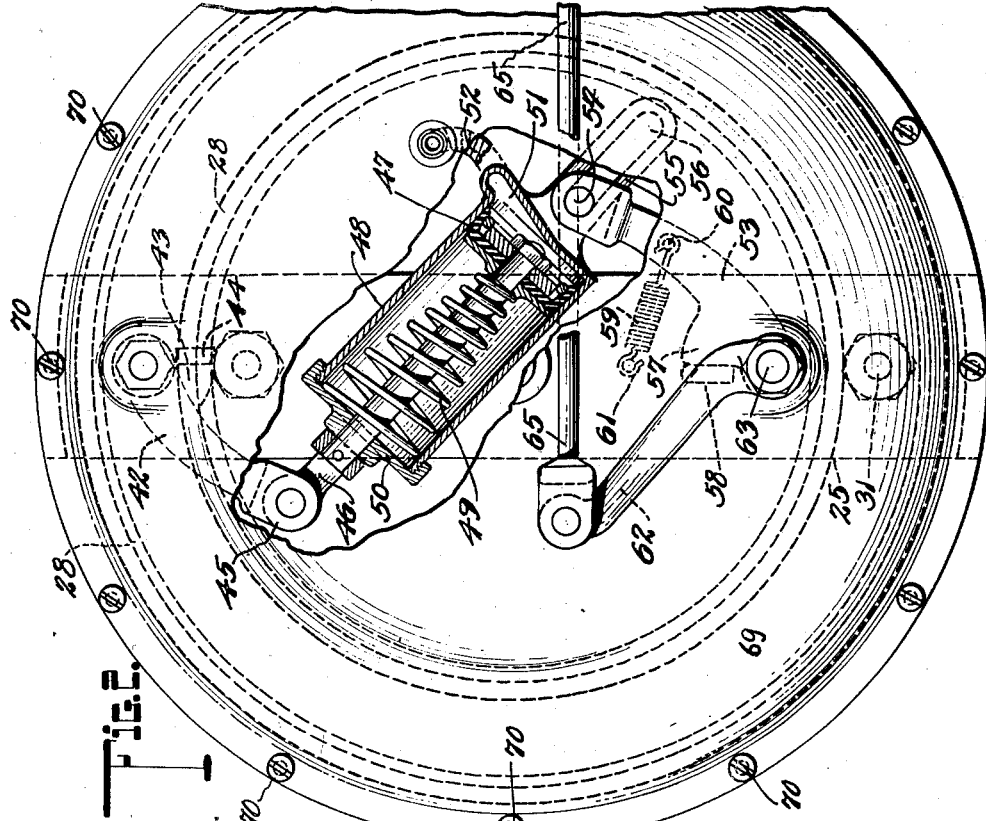

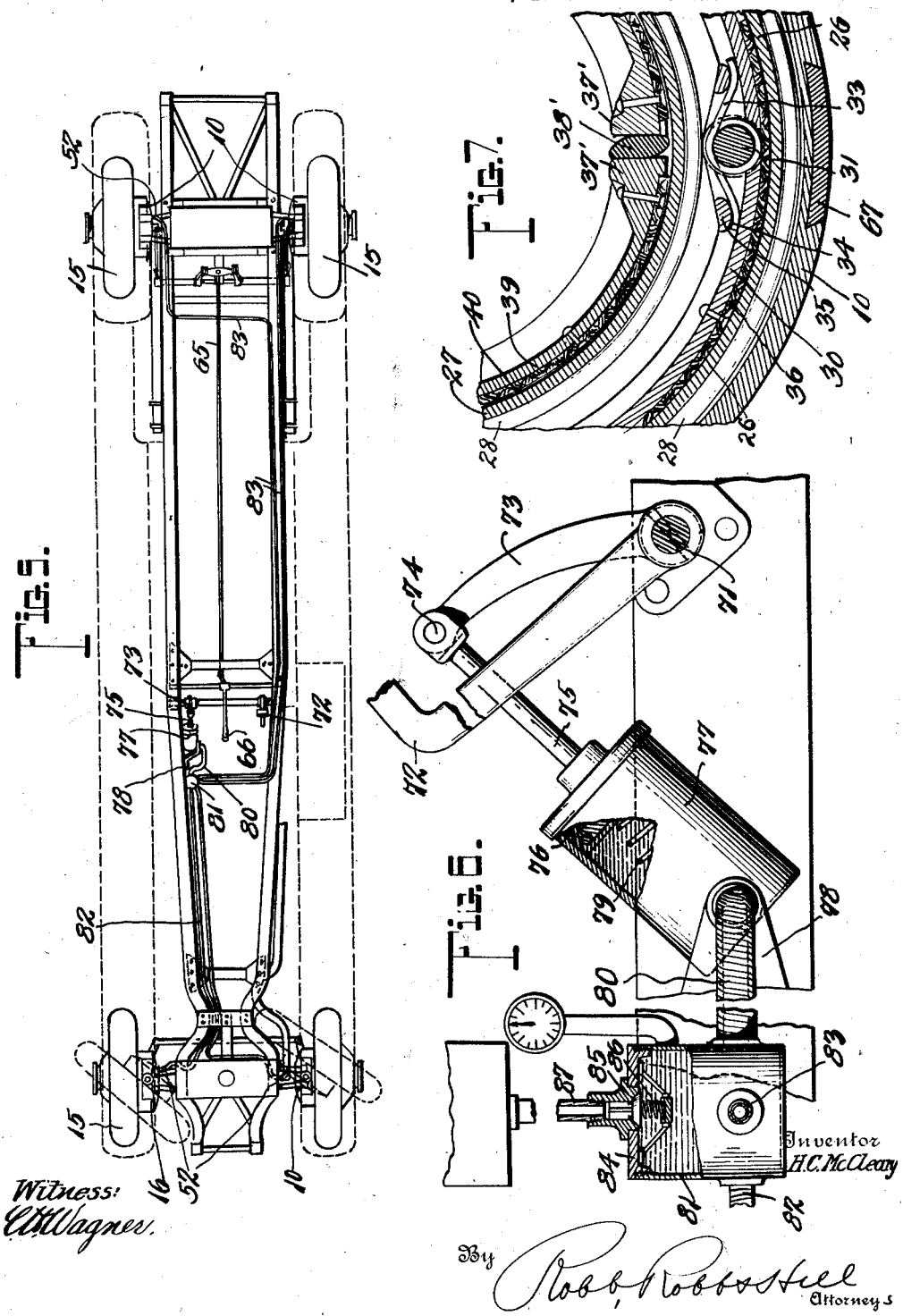

Patented July 21, 1925.

1,546,985

UNITED STATES PATENT OFFICE.

HARRY C. McCLEARY, OF WASHINGTON, DISTRICT OF COLUMBIA, ASSIGNOR TO MAJESTIC PATENTS CORP., OF NEW YORK, N. Y., A CORPORATION OF NEW YORK.

HYDRAULIC BRAKE SYSTEM.

Application filed March 11, 1924. Serial No. 698,484.

*To all whom it may concern:*

Be it known that I, HARRY C. MCCLEARY, a citizen of the United States, residing at Washington, in the District of Columbia, have invented certain new and useful Improvements in Hydraulic Brake Systems, of which the following is a specification.

This invention relates to a hydraulic brake system, and particularly to a fluid pressure actuated device adapted for application to frictional brakes for vehicle wheels or similar rotatable members.

In prior systems of this character which employed a piston for actuating a brake shoe, the area of frictional contact surface has been so limited as to prevent its practical adoption for use upon a heavy vehicle which could not be satisfactorily stopped and held when the brake was applied.

The invention has for an object to provide a novel and improved construction embodying a plurality of brake drums having cooperative shoes connected for operation by a pressure actuated cylinder to effect a graduated application of the brake and provide an extended contact area which insures frictional holding of the vehicle under all conditions.

A further object of the invention is to provide a plurality of brake drums having cooperating shoes each adapted to be operated by a pressure actuated cylinder in connection with means by which one of the brake shoes may be manually applied independent of the power actuation.

Other and further objects and advantages of the invention will be hereinafter set forth and the novel features thereof defined by the appended claims.

In the drawing:

Figure 1 is a vertical section;

Figure 2 is a rear elevation, with parts broken away to show the actuating cylinder in section;

Figure 3 is a section on line 3—3 of Figure 1;

Figure 4 is an elevation of a wheel with the opposite ends of its axle in section;

Figure 5 is a top plan showing the application of the invention to a four-wheel vehicle brake;

Figure 6 is a detail section of the connection from the brake lever; and

Figure 7 is a section on line 7—7 of Figure 1.

Like numerals refer to like parts throughout the several figures of the drawing.

For the purpose of illustration, the invention is shown as applied to a vehicle wheel in which the brake drum is rotated in the travel of the wheel, but the construction is also adapted for other types of rotating bodies. In the form shown the numeral 10 designates a casing which is relatively fixed being shown as part of the axle housing and through which an axle member 11 extends. The axle 11 is provided at its inner end with a brake drum 12 having its hub 13 keyed upon the axle and retained thereon by a proper nut 14. This axle may be driven to rotate the drum in any desired manner, for instance as shown in my Patent 1,509,757 dated September 3, 1924. This driving means is generally disclosed in Figure 4 where the wheel 15 is provided with a plate 16 apertured to seat upon the angular end 17 of the axle and there clamped by a nut 18 enclosed within the hub cap 19. This axle is formed with a lubricating passage 20 therethrough which is fed by a distributing ring 21 carried by a bracket 22 and loosely engaging the inner end of the axle 11. The distributing ring 21 is fed by means of a connecting conduit 23 which passes through an aperture 24 in the supporting plate 25 upon which the bracket 22 is also mounted.

The brake drum 12 is formed with an outer contact face 26 and a concentric inner contact face 27 formed by lateral rings extended from the drum 12 constituting the body of the drum. These contact faces are each provided upon their outer faces with radiating ribs 28 of any desired character which tend to reduce the temperature thereof and prevent injury to the brake linings.

The supporting plate 25 carries segmental brake shoes 30 which are pivotally mounted upon a post 31 secured to the plate 25 by means of their hub portions 32 and are normally held in retracted position by means of a tension spring 33 surrounding the pivot 31 and having its opposite ends 34 disposed beneath lugs 35 carried by the shoes 30. Each shoe is provided with the usual brake lining 36 which engages the inner face of the drum member 26. The opposite ends of the segmental brake shoes are provided with contact blocks 37 between which a separating cam 38 is disposed. A similar construction of pivot and separating means is provided for the inner brake shoes 39 which are provided with the brake lining 40 and cooperate with the brake drum member 27. The inner shoes 39 are actuated by a shaft 31' carrying a cam 38' operating against blocks 37'. The pivots of the inner and outer brake shoes are disposed at opposite sides of the center of the drum to properly adapt them for the application of the actuating means to be hereinafter described.

This actuating means comprises a shaft 41 extended from the separating cam 38 and having pivotal mounting in the supporting plate 25 while its outer end is provided with a lever 42 secured thereto and formed with a shoulder 43 adapted to engage a stop 44 upon the supporting plate 25. The outer end of the lever 42 is pivotally connected at 45 with the rod 46 of a piston member 47 disposed within a cylinder 48. The rod 46 is surrounded by a restoring spring 49 disposed within the cylinder and extending between the piston and the cylinder head 50. At the opposite end of the cylinder a pressure intake chamber 51 is provided and communicates with a conduit 52 adapted to supply a fluid pressure of any desired character such as water or oil to the cylinder for the purpose of moving the parts in opposite directions to jointly actuate both the inner and outer brake shoes. For the purpose of this joint actuation the separating cam opposite to that first described is provided with a lever 53 pivotally connected at 54 to the cylinder 48 by means of an extension 55 therefrom having an elongated slot 56. The lever 53 is provided with a shoulder 57 cooperating with a stop 58 similar to the parts 43 and 44 before described. In order to properly restore the parts when the braking pressure is relieved, a spring 59 may be provided and is connected to the lever 53 at 60 and at its opposite end to a fixed support 61.

The construction just described also provides for the manual actuation of one set of brake shoes entirely independent of the automatic pressure control thereof. For this purpose a lever 62 is secured upon the shaft 63 of the separating cam 38 for the inner brake shoes and a pivotal connection 65 extends from said lever to a position convenient to the operator of the car where it may be actuated by any desired means such as a hand lever 66 (see Figure 5). The slotted connection of lever 53 at 56 permits such operation independent of the pressure cylinder 48.

The supporting plate 25 is provided with lateral securing flanges 67 adapted to be inset in the flange of the casing 10 and secured thereto by any desired means, for instance the screws 68. This provides a structure which can be completely enclosed against injury or dirt and water by means of a cover plate 69 secured thereto in any desired manner, for instance by circumferential fastenings 70. This plate is provided with suitable apertures through which the lubricating and pressure connections pass and also the manual actuating lever which is secured to the separating cam for the inner shoes.

For the purpose of controlling the application of the fluid pressure to the actuating cylinder 48 any desired means may be used but a preferable form thereof is shown in Figures 5 and 6 wherein the shaft 71 of the usual foot brake lever 72 is provided with an arm 73 pivotally connected at 74 with a piston rod 75 carrying a piston 76 within a pivotally mounted cylinder 77 carried by a supporting bracket 78. This cylinder is provided with a restoring spring 79 extending between the piston and its opposite end and a conduit 80 extends therefrom to a distributing chamber 81 from which the connecting pipes 82 extend to the front brakes and similar pipes 83 extend to the rear brakes. This chamber is also provided with means by which it may be automatically fed from a reservoir and these comprise a cap 84 provided with a valve 85 normally held in closed position by a spring 86 and controlling the intake of fluid from a pipe 87 extending to any suitable reservoir. It will be obvious that when the amount of liquid within this chamber and the communicating system falls below the normal amount through leakage or other causes, the suction produced by the operation of the piston at the brake lever will be sufficient to permit the intake of fluid until the distributing chamber is filled and the pressure of such fluid then positively closes the valve controlling the intake from the reservoir.

In the operation of the invention it will be seen that pressure upon the brake lever will expel the fluid from the cylinder communicating with the distributing chamber and that an equal pressure extends therefrom to the actuating cylinder upon each of the brakes. The introduction of pressure into this cylinder causes the piston and cylinder to move in opposite directions thus actuating the separating cams for both the inner and outer brake shoes which cooperate with the concentric brake drums. In order to equalize the movement and pressure applied to these shoes it will be noticed that the lever from the outer brake shoe is shorter than the lever from the separator for the inner shoes, thus compensating for their difference from the axis of the brake drum. By this construction the brakes may be applied with a graduation of frictional resistance and present sufficient surface area through the concentric arrangement to provide for the effectual holding of a heavy car even on steep grades, and to positively check the movement thereof at high speeds without the necessity of applying the brakes to a wheel locking tension.

This arrangement of the brake shoes and drum provides a construction in which the parts may be closely nested to secure the maximum area of braking resistance within the least possible space and the pivotal mounting of the brake shoe segments lifts the shoes away from the brake drum and under normal conditions supports the opposite ends in close contact with the separating cam so as to prevent dragging of the brakes.

When the pressure is relieved from the cylinder the piston is restored by means of the spring therein and the brake levers brought to rest in contact with the stop members. In this position of the parts the inner brake member is adapted for actuation through direct manual control so that provision is made for setting the brake when the car is standing and also to provide against any possible failure of the pressure means to fully act on the brake shoes. The brake shoes and their actuating mechanism are mounted as a cooperative unit adapted for direct removal from the enclosing casing by a simple disconnection at the opposite ends of the plate and when these parts are thus withdrawn the brake drum may be readily removed for any purpose desired by simple removal of the nut at the end of its driving axle. This provides a construction which may be very readily assembled and in which all of the operative elements are conveniently accessible for cleansing or repair without necessity of disturbing the driving wheel of the vehicle.

It will be seen that the invention is particularly adapted for a four wheel brake as indicated in Figure 5, but is not confined to such application.

While the specific details of construction have been herein shown and described, the invention is not confined thereto as changes and alterations may be made without departing from the spirit thereof as defined by the following claims.

Having thus described my invention, what I claim as new and desire to secure by Letters Patent is:

1. In a fluid pressure brake, a drum having a plurality of frictional braking faces, shoes cooperating with said faces and having their separable ends disposed at substantially opposite points, actuators for said shoes, and power means having oppositely movable members travelling in a substantially radial path and connected to said actuators.

2. In a fluid pressure brake, a drum having a plurality of frictional braking faces, shoes cooperating with said faces, a single means for actuating said shoes, and independent means for actuating the shoe cooperating with one of said faces.

3. In a fluid pressure brake, a drum having a plurality of frictional braking faces, shoes cooperating with said faces, fluid pressure means for jointly actuating said shoes, a brake lever for independently actuating one shoe, a pressure cylinder and piston, and a connecting conduit from said cylinder to the fluid pressure means.

4. In a fluid pressure brake, a drum having a plurality of frictional braking faces, shoes cooperating with said faces and having their separable ends disposed at substantially opposite points, actuators for said shoes, and power means comprising oppositely movable members extending in a direct line between said actuators.

5. In a fluid pressure brake, a drum having a plurality of frictional braking faces, shoes cooperating with said faces, and a single means for simultaneously actuating said shoes, comprising a cylinder and piston each connected to expanders for the respective shoes.

6. In a fluid pressure brake, a drum provided with lateral braking faces spaced from each other, shoes mounted to cooperate with said faces, expanders for said shoes provided with actuating levers, and power means intermediate the levers and operable in opposite directions for operating said levers.

7. In a fluid pressure brake, a drum provided with lateral braking faces spaced from each other, shoes mounted to cooperate with said faces, expanders for said shoes provided with actuating levers, a movable cylinder connected to one of said levers, a movable piston within said cylinder connected to the other lever, and means for introducing a fluid pressure within said cylinder.

8. In a fluid pressure brake, a drum provided with lateral braking faces spaced from each other, shoes mounted to cooperate with said faces, expanders for said shoes provided with actuating levers, a cylinder connected to one of said levers, a piston within said cylinder connected to the other lever, means for introducing a fluid pressure within said cylinder, and means in said cylinder for restoring the shoes to inoperative position when pressure is relieved within the cylinder.

9. In a fluid pressure brake, a drum provided with lateral braking faces spaced from each other, shoes mounted to cooperate with said faces, expanders for said shoes provided with actuating levers, a cylinder connected to one of said levers, a piston within said cylinder connected to the other lever, means for introducing a fluid pressure within said cylinder, means in said cylinder for restoring the shoes to inoperative position when pressure is relieved within the cylinder, an independent lever secured to one of said expanders, and means for permitting operation of said independent lever without affecting the piston and cylinder connection.

10. In a fluid pressure brake, a drum having concentric lateral braking faces, brake shoes cooperating with said faces, expanders for said shoes provided with actuating levers, a power member for jointly actuating both of said levers, means for actuating one of the shoes independent of said member, and cooling means disposed upon said braking faces.

11. In a fluid pressure brake, a drum having concentric lateral braking faces, brake shoes cooperating with said faces, expanders for said shoes provided with actuating levers, a power member for actuating both of said levers, one of said levers being of greater length than the other to produce an equal braking action upon the respective shoes.

12. In a fluid pressure brake, a drum having a frictional braking surface, segmental shoes cooperating therewith and pivotally connected, a separator disposed at the free ends of said shoes, a lever extending therefrom, an abutment upon said lever, a fixed stop disposed upon a fixed part in the path of the abutment to be engaged by said abutment when the shoes are in released position, and tension means for holding the abutment and stop in contact.

13. In a fluid pressure brake, a drum having a frictional braking surface, segmental shoes cooperating therewith and pivotally connected, a separator disposed at the free ends of said shoes, a lever extending therefrom, an abutment upon said lever, a fixed stop disposed to be engaged by said abutment when the shoes are in released position, tension means for retaining said abutment and stop in contact, and a spring surrounding the pivot of said shoes and connected to the opposite shoes to normally hold the same in such released position.

14. In a fluid pressure brake, a drum having a plurality of frictional braking faces, shoes cooperating with said faces and having their separable ends disposed at substantially opposite points, actuators for said shoes, and a piston and cylinder disposed between said actuators and having its members movable in opposite directions.

15. In a fluid pressure brake, a drum having a frictional braking face, a shoe cooperating therewith, means for forcing said shoe into contact with said face comprising piston and cylinder members, one of said members being provided with an extension having an elongated slot, an independent operating lever for said shoe adapted to travel in said slot, and a connection for actuating said independent lever separately from the power cylinder.

16. In a fluid pressure brake, a drum having a frictional braking face, a shoe cooperating therewith, means for forcing said shoe into contact with said face comprising piston and cylinder members, one of said members being provided with an extension having an elongated slot, an independent operating lever for said shoe adapted to travel in said slot, a connection for actuating said independent lever separately from the power cylinder, and a retracting spring extending from said independent lever to a fixed point.

17. In a fluid pressure brake, a drum having a plurality of frictional braking faces, shoes cooperating with said faces, means for expanding said shoes provided with operating levers, and a fluid pressure cylinder and piston connected to said levers and adapted for movement in opposite directions.

18. In a fluid pressure brake, a drum having a plurality of frictional braking faces, shoes cooperating with said faces, means for expanding said shoes provided with operating levers, a fluid pressure cylinder and piston connected to said levers and adapted for movement in opposite directions, and means for independently operating one of said brake shoes and connected for movement relative to the cylinder member.

19. In a fluid pressure brake, a drum having a plurality of frictional braking faces, shoes cooperating with said faces and having their separable ends disposed at substantially opposite points, actuators for said shoes, and a piston and cylinder supported by the actuator levers and having each member thereof movable in opposite straight paths.

20. In a fluid pressure brake, an enclosing casing, a brake drum disposed therein, a supporting unit carrying shoes and actuating means insertible into operative relation with said drum, a driving shaft, and a detachable connection between the said brake drum and driving shaft to permit withdrawal of the drum from said casing.

21. In a fluid pressure brake, an enclosing casing, a brake drum disposed therein, a supporting unit carrying shoes and actuating means insertible into operative relation with said drum, and a protecting cover secured to said casing to enclose said supporting unit.

22. In a fluid pressure brake, an enclosing casing, a brake drum disposed therein, a supporting plate detachably mounted upon said casing, brake shoes and actuating means therefor pivotally mounted in said plate, levers carried by the actuating means for said shoes, and an operating cylinder and piston pivotally connected to said levers.

23. In a fluid pressure brake, an enclosing casing, a driving shaft extending therethrough, a brake drum secured to said shaft and provided with independent concentric braking surfaces, and a supporting unit carrying brake shoes and actuating means therefor insertible within said casing and into operative relation with said concentric braking faces.

24. In a fluid pressure brake, a brake drum, a cooperating shoe, a pressure cylinder and piston for actuating said shoe, a brake shaft provided with an operating lever, a rigid arm from said shaft, a pivotally mounted cylinder, a piston therein having its rod in alinement with and directly connected to said arm, and a fluid pressure connection from said pivoted cylinder to the actuating cylinder for the brake shoe.

25. In a fluid pressure brake, a brake drum, a cooperating shoe, a pressure cylinder and piston for actuating said shoe, a brake shaft provided with an operating lever, an arm from said shaft, a pivotally mounted cylinder, a piston therein having its rod connected to said arm, a fluid pressure connection from said pivoted cylinder to the actuating cylinder for the brake shoe, a distributing chamber interposed in said connection, a cover plate therefor having an inwardly opening valve, and a reservoir connected to said cover plate.

26. In a fluid pressure brake, a brake drum, brake shoes cooperating therewith, an actuating piston and cylinder connected to said shoes, a brake shaft provided with an operating lever, means carried by said shaft for creating a fluid pressure, a conduit extending from said means to the brake actuating cylinder, a distributing chamber interposed in said conduit, a reservoir communicating with said chamber, and a valve inlet to said chamber adapted to permit the flow of fluid thereinto to maintain the fluid supply for said conduit.

In testimony whereof I affix my signature.

HARRY C. McCLEARY.